United States Patent [19]
Khanna et al.

[11] Patent Number: 5,324,816
[45] Date of Patent: Jun. 28, 1994

[54] PROCESS FOR IMPROVING THE PROPERTIES OF POLYMERS

[75] Inventors: Yash P. Khanna, Cedar Knolls; John J. Belles, Jr.; Annemarie C. Reimschuessel, both of Morristown, all of N.J.; Asis Banerjie, Madras, India

[73] Assignee: Allied-Signal Inc., Morristown, N.J.

[21] Appl. No.: 366,122

[22] Filed: Jun. 14, 1989

Related U.S. Application Data

[63] Continuation-in-part of Ser. No. 64,364, Jun. 22, 1987, abandoned.

[51] Int. Cl.$^5$ .................................................. C08F 6/00
[52] U.S. Cl. ............................ 528/481; 528/502; 528/503
[58] Field of Search ................... 528/481, 502, 503

[56] References Cited

U.S. PATENT DOCUMENTS

| | | | |
|---|---|---|---|
| 4,110,303 | 8/1978 | Gergen et al. | 525/92 |
| 4,120,849 | 10/1978 | Breitschaft et al. | 528/502 |
| 4,133,802 | 6/1979 | Hoshidoshi et al. | 528/502 |
| 4,195,161 | 3/1980 | Davis et al. | 528/502 |
| 4,223,128 | 9/1980 | Halek et al. | 528/481 |
| 4,242,470 | 12/1980 | Gergen et al. | 528/92 |
| 4,396,182 | 5/1983 | Zijp | 528/232 |
| 4,447,599 | 5/1984 | Cogswell et al. | 528/502 |
| 4,540,774 | 8/1985 | Gerking et al. | 528/502 |

OTHER PUBLICATIONS

A. Ajji et al. "Chain Entanglement and Viscoelastic Properties of Molten Polymers" Jrnl of Polymer Science: Part B: Polymer Physics, vol. 24/1983-90 (1986).

R. Schertzer et al. "Shear and Thermal History Effects in Polypropylen Melts" Jrnl of Applied Science, vol. 31, 809-821 (1986).

A. Rudin et al. "Shear Modification of Polymers" Polymer Engineering and Science, Mid-Jun. 1983, vol. 23, No. 8.

*Primary Examiner*—Melvyn I. Marquis
*Attorney, Agent, or Firm*—Darryl L. Webster; Richard C. Stewart, II; Gerhard H. Fuchs

[57] ABSTRACT

This invention relates to a process for improving the optical, thermal and/or mechanical properties of a polymer by subjecting a melt of the polymer to a shearing action at an effective shear rate, as for example a shear rate of greater than about 100 sec$^{-1}$, for a time sufficient to improve said properties.

22 Claims, 6 Drawing Sheets

VIRGIN

EXTRUDED

PROCESS FOR IMPROVING THE PROPERTIES OF POLYMERS

RELATED APPLICATION

This application is a continuation-in-part application of U.S. patent application Ser. No. 064,364, filed Jun. 22, 1987, now abandoned.

BACKGROUND OF THE INVENTION

1. Field of the Invention

This invention relates to a process for modifying polymers during and after fabrication. More particularly, this invention relates to a process for improving the thermal, optical and/or mechanical characteristics of polymers.

2. Prior Art

X-ray diffraction studies of synthetic linear polyamides such as nylon 6 have shown that they may exist in one or more of several different crystalline forms. Structures which have been recognized include, in the case of nylon 6, the amorphous form, the pseudo hexagonal gamma-form, and the monoclinic alpha form.

The amorphous form of nylon 6 is obtained by rapid quenching of molten polymer to a temperature below the glass transition temperature of the nylon. Both the amorphous and gamma-forms are relatively unstable upon application of heat and moisture. Heating amorphous material to a temperature between approximately 55° C. and 150° C. results in at least a partial conversion of the amorphous form into the gamma-form. At temperatures above 150° C., a transition of the gamms- into the alpha-form occurs. This monoclinic alpha structure represents a highly ordered crystalline form that is stable at temperatures up to the melting point of the nylon 6. It is the most desirable crystalline form from the standpoint of obtaining the optimum physical properties with nylon 6, including mold shrinkage and maximum dimensional stability.

The "super" or morphological structure in which the crystalline units are arranged also affects the physical properties of nylons. The crystalline units are arranged in polycrystalline aggregates known as spherulites. These spherulites may be detected by microscopic examination under polarized light. They are characterized by a more or less symmetrical growth in all directions from a nucleus and are composite structures made up of crystalline and amorphous regions. The number and size of the spherulites determines the texture or graininess in the bulk of the material and influences optical as well as physical properties. Physical properties improve with increasing homogeneity and fineness of the spherulitic structure throughout the bulk of the material.

To obtain optimum physical properties in articles fabricated from nylon 6, it is desirable, therefore, to produce a highly crystalline material, crystallized predominantly in the stable alpha-form, with an extremely fine, dense and uniform morphological structure. Among the physical properties affected by increased crystallinity and improved morphological structure are abrasion resistance, heat distortion temperature, inherent stability or resistance to deformation, resistance to hot water, coefficient of expansion, hardness, tensile yield strength and surface hardness.

Customary fabricating procedures used with nylon 6 such as injection molding, which include a rapid cooling from the melt, generally result in articles which contain the different crystalline structural forms to a varying degree depending upon the thermal history of the article.

It is known that a greater degree of crystallinity is obtained when polyamides are cooled extremely slowly from the melt; however, under these conditions, large spherulites develop which is not desirable. Moreover, the process is not economical. Crystallinity and the uniformity of the morphological structure can also be increased by annealing treatments after solidification. However, such practices are not economically feasible in ordinary industrial fabricating procedures as, for example, injection molding. More recently, investigators have found that bodies shaped from polyamides having a homogeneous and fine spherulitic structure can be obtained by addition to the polyamide melt of finely divided nucleating agents which act as crystallization nuclei. (e.g. U.S. Pat. Nos. 2,855,377; 3,261,800 and 3,080,345; Belgian Patent 674,170; Japanese Patent Nos. 52-105958 and 80-041623, U.S. Pat. No. 4,501,844; Gurato, G. et al. "Influence of Nucleating Agents on the Crystallization of Nylon 6", Makromol. Chem., Vol. 179(1), pp. 231 to 245 (1978); Chatterjee, A. M., et al., "Heterogeneous Nucleation of Crystallization of High Polymers From the Melt", J. Polym. Sci., Polym. Phys. Ed., Vol. 13(12), pp. 2368-83 (1975); and Koutsky, J. A., "Nucleation of Polymer Droplets", J. Appl. Phys., Vol. 38(4), pp. 1832-39 (1967).

The function of nucleating agents when cooling semi-crystalline polymers from the molten into the solid form is to increase the number of nuclei formed in a given time interval at a predetermined temperature. The final and over-all crystallinity, however, depends not only on the number of nuclei that are formed but also on the spherulitic growth rate from such nuclei. As noted above, spherulites develop with respect to a center, or nucleus, of growth. Addition of the nucleating agents thus provides a large number of sites for growth upon cooling from a melt. In order to be of practical use, such nucleating agents not only must produce a fine spherulitic structure but also must do this under conditions of rapid cooling to a temperature above the glass transition temperature of the polyamide, i.e., they must reduce the time that is necessary under a given set of conditions for crystallization to start. This time is usually referred to as "induction time". Subsequent growth from the spherulitic center depends on the polymer chain mobility. Thus, a factor in the spherulitic growth rate is the macroscopic viscosity of the polymer and its temperature dependence. All segmental motion is "frozen in" at the glass transition temperature (Tg) and no additional crystallization occurs even when nuclei are present. This Tg is about 50° C. in nylon 6.

Other prior art describes other additives which can be used in addition to nucleating agents to enhance their effectiveness. For example, U.S. Pat. No. 3,549,651 discloses that the effectiveness of nucleating agents for linear polyamides in terms of the rate of crystallization into the desirable crystalline form can be increased by using a plasticizer in conjunction with the nucleating agent. U.S. Pat. No. 4,200,707 discloses the use of zinc phenyl phosphinate and zinc phenyl phosphonate as nucleating agents for certain polyamides, and U.S. Pat. No. 3,867,339 describes polyamides containing sodium phenyl phosphinate and a calcium salt. U.S. Pat. No. 4,397,979 discloses that materials such as lithium metasilicate, lithium aluminate, lithium metaphosphate, lithium fluoride, magnesium fluoride, zirconium tetrafluoride, zirconium silicate and mixtures thereof. Great Britain Patent No. 1,211,689 and German Patent No. 1,694,476 disclose that substances such as calcium fluoride, molybdenum disulfide, lead tungstate, anitmony trioxide, graphite, talcum and asbestos are effective nucleating agents. U.S. Pat. No. 4,159,286 discloses the use of polytetrafluoroethylene and at least one water insoluble organic salt or inorganic salt or oxide as the nucleating agent. U.S. Pat. No. 3,645,932 describes a process of developing rapidly the crystalline characteristics of certain polyamides by incorporation of a variety of nylon and other polyamide resins, polyethylene, polypropylene, polycarbonate and polyethylene acrylic acid copolymer ionomers. U.S. Pat. Nos. 4,536,533 and 4,501,844 disclose a rapidly crystallizable composition comprising (a) a linear polyamide selected from the series poly(4,4'-methylenediphenylene azelamide to dodecanediamide); and (b) an amount sufficient to promote the crystallization of the linear polyamide, of a material selected from the group of (I) talc, (II) sodium benzenesulfonate, (III) a polyethylene ionomer, (IV) a methoacrylated butadien-styrene, and (V) a multi-phase composite interpolymer. The compositions crystallize rapidly from the molten state which allows for economically attractive molding procedures including fiber production and the production of aromatic-aliphatic polyamides having a combination of excellent properties.

U.S. Pat. No. 3,400,087 discloses that the rate of crystal growth without substantial increase in the percent of total crystallization of polyamides is obtained by incorporating in the melt finely divided calcite particles and a fatty alcohol. DD Appln. No. 103,456 describes the use of nucleating agents for polyamides, especially tannin. Japanese Patent No. 73 017552 discloses a composition comprising a polyamide, Ie.g. nylon 6, 11, 12, 66, 610, etc.) and 0.01-3 wt % of a compound selected from As-oxide, Sb-oxide and Bi-oxide, talc and clay, and 0.01-3 wt % of either a polyvalent alcohol (elg. trimethylolethane, trimethylolpropane, erythritol, sorbitol, amnnitol, etc.), or an aromatic ketone (e.g. benzophenone, phenyl benzyl ketone, dibenzoyl, benzoyl methane, etc.).

U.S. Pat. No. 3,645,932 discloses nucleating agents selected from: (a) polymers and copolymers of monolefins, having from 2 to 6 carbon atoms the ionomer of ethyleneacrylic acid copolymer; (b) a polyamide of 1) epsilon-caprolactam, 2) omega-amino undecanoic acid, 3) omega-aminododecanoic acid, 4) hexamethylene diamine and adipic acid, 5) hexamethylene diamine and sebasic acid, or a copolyamide resin derived from polymeric fatty acids, sebasic acid and bisamino-ethyl benzene; (c) polycarbonate of p,pl-isopropyliodenediphenol and phosgene; (d) polystyrene terpolymers of acrylonitrile, butadiene and styrene; (e) natural rubber, balata; and (f) paraffin wax, microcrystalline wax, are dispersed in an amount of 0.1-10 wt % in a crystalline polyamide derived from hydrogenated polymeric fatty acid, a coacid having from 6 to 10 carbon atoms and a diamine, and 25-75 wt % of the polyamide derived from the reaction product of the coacid and diamine.

U.S. Pat. No. 3,549,651 describes a solid synthetic linear polyamide composition having enhanced crystalline uniformity, the polyamide having dispersed in it about 0.10-5.0 weight percent of a finely divided nucleating agent selected from a group consisting of sodium phenyl phosphinate, sodium isobutyl phosphinate, silver bromide, molybdenum disulphide, boron nitride, the sodium complex of phthalocyanine and talcum, and from about 0.25-20 weight percent of a plasticizing agent selected from the group consisting of triethylene glycol, 2-ethyl-1,3 hexane-diol, tricresylphosphate, N-ethyl ortho- and para-toluene sulfonamide, and a mixture of N-ethyl and p-toluene sulfonamide.

U.S. Pat. No. 4,518,731 discloses that an adduct of aryl carboxylic or sulphonic acid and crystalline zeolite functions as a nucleating agent for crystalline polymers.

U.S. Pat. No. 3,367,936 describes a nucleating agent for crystalline copolymers selected from poly-alpha-olefins, thermoplastic polyesters, and polyamides, which comprises an adduct obtained by interaction of (a) an aryl-carboxylic acid or sulphonic acid chosen from those which in the form of metal salts are known to exert a nucleating effect on the crystalline polymers of alph olefins, the acid having a melting point greater than the crystallization temperature of the polymer and being thermally stable at the maximum operational temperature in processing of the polymeric material, and (b) a crystalline aluminum silicate of an alkaline or alkaline earth metal of the zeolitic tectosilicate type, having a pore diameter of 3A-13A and a molar ration $SiO_2/Al_2O_3 = 2-5$, in powder form, under such conditions that allow chemi-absorption of the acid(a) in component (b), such that 1-25 g (a) is present per 100 g (b) and (a) is partly bound to (b) by chemical bonds of polar type.

DD Patent No. 151,317 describes the fact that polymerization of alph-crystallin Epsilon-polymerization shaped objects stabilized by additives involves the addition by weight of 0.01-0.2% CuCll, 0.02-0.5% KBr, 0.2-2.0% melamine, 0.01-0.5 (0.05-0.2) % talcum and 0.1-2.0% of a metal salt of a 12-20 C monocarboxylic acid (preferably 0.2-1.0 wt % calcium or zinc stearate) to the caprolactam, as well as any pigments, fillers or reinforcing agents that may be required. The additives serve to stabilize the product.

SUMMARY OF THE INVENTION

This invention relates to a process for improving the optical, thermal and/or mechanical properties of polymers. More particularly, this invention relates to such a process which comprises the steps of:

(a) forming a melt of one or more of said polymer; and (b) subjecting said melt to a shear having an effective shear rate for a time sufficient to improve the optical, thermal and/or mechanical properties of said polymers to any extent. As used herein, "shear" is an action or stress resulting from applied force that causes or tends to cause two contiguous parts of the melt to slide relative to each other in a direction substantially parallel to their plane of contact.

Figure 1:
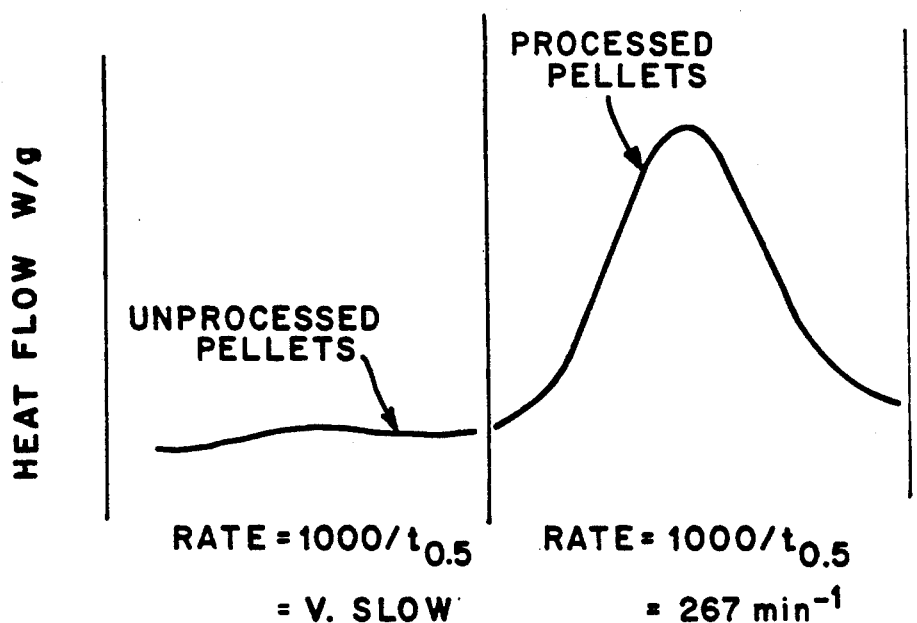
FIG. 1 is a graph of the rate of isothermal crystallization of nylon 6 pellets treated in accordance with the process of this invention, and untreated pellets, at 200 C. as a function of time.
Figure 2:
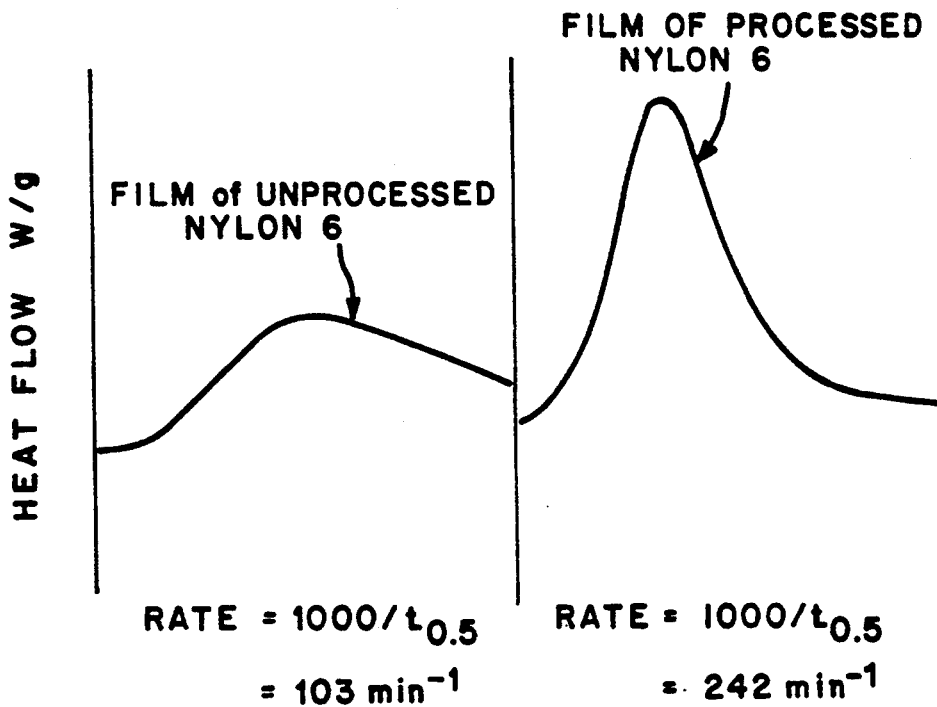
FIG. 2 is a graph of the rate of isothermal crystallization of compression molded films of nylon 6 treated in accordance with the process of this invention and compression molded films of untreated nylon 6.
Figure 3A:
FIG. 3A is an optical photomicrograph of compression molded film of nylon 6 treated in accordance with the process of this invention and FIG. 3B is an optical photomicrograph of molded film of untreated nylon 6 crystallized in a differential scanning calorimeter at 200° C.
Figure 3B:
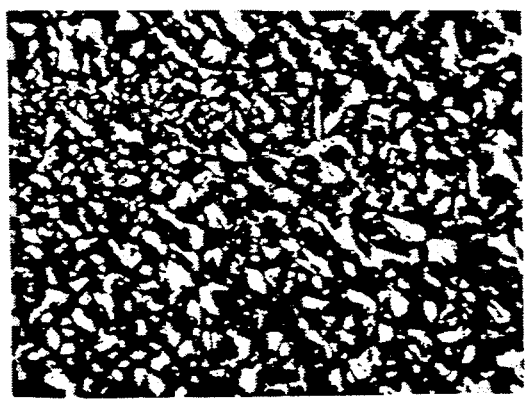
Figure 4:
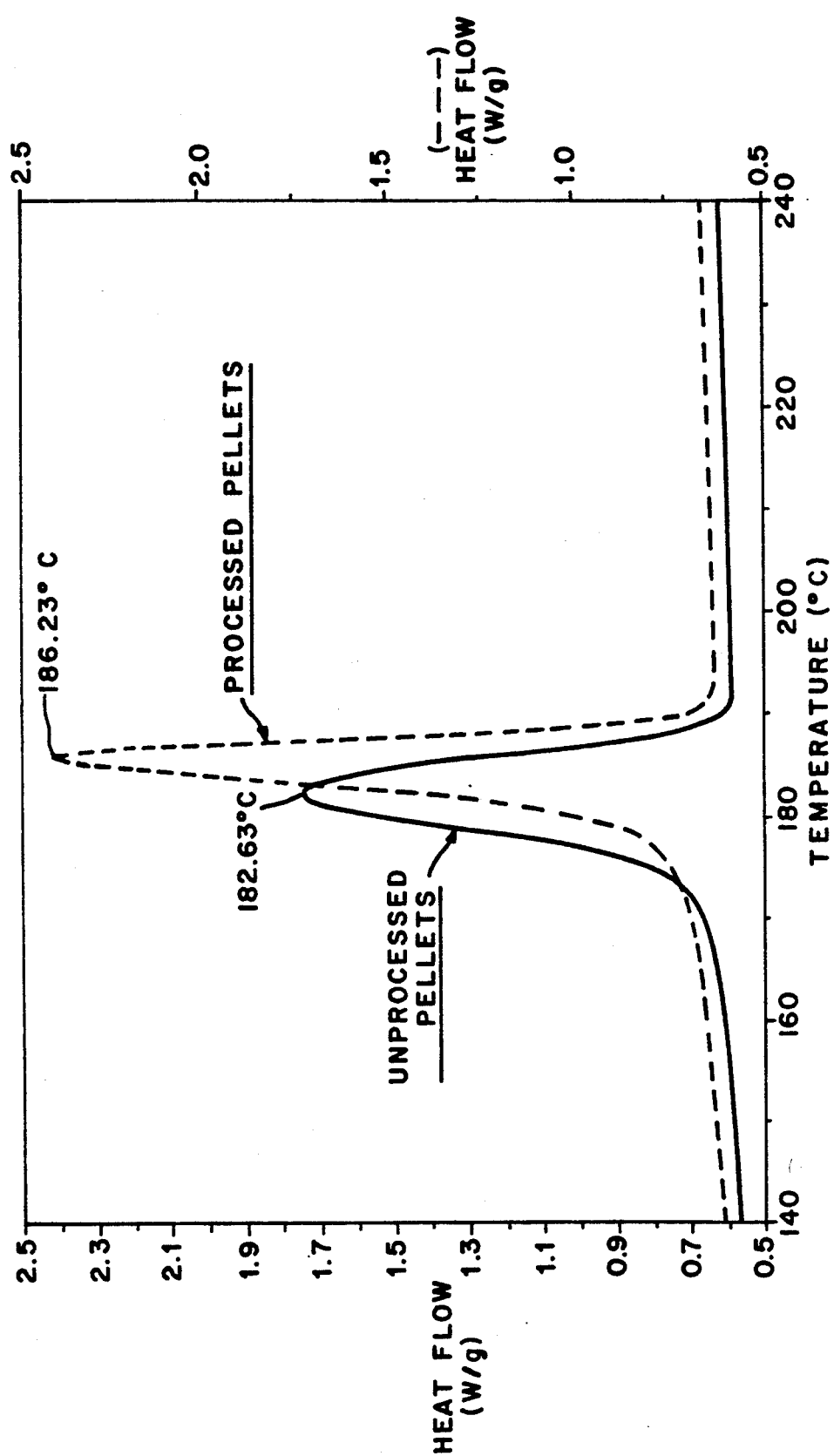

FIG. 4 is differential scanning calorimeter cooling curves showing the crystallization of injection moldings made from nylon 6 treated in accordance with this invention and made from untreated nylon 6.

Figure 5A:
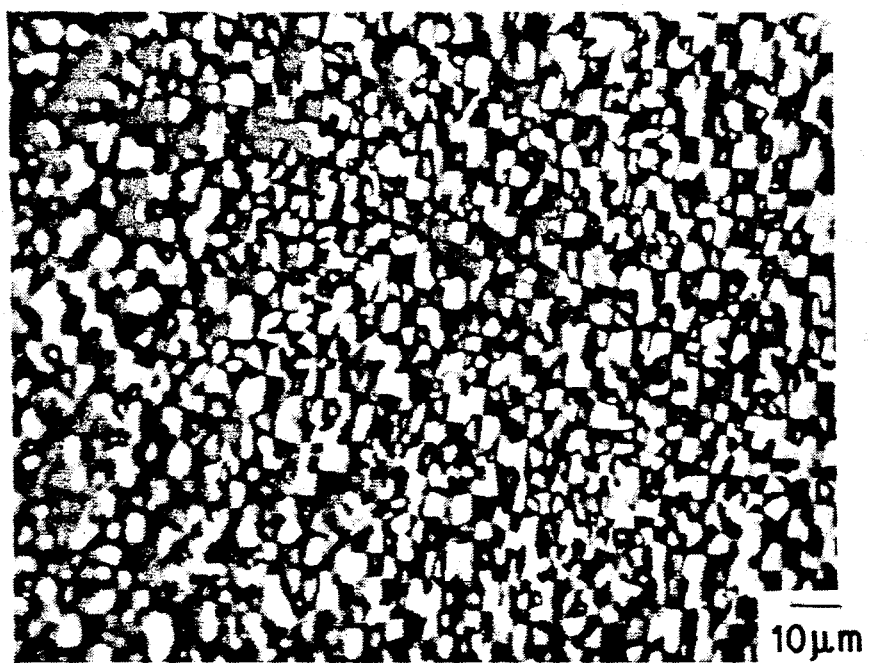
Figure 5B:
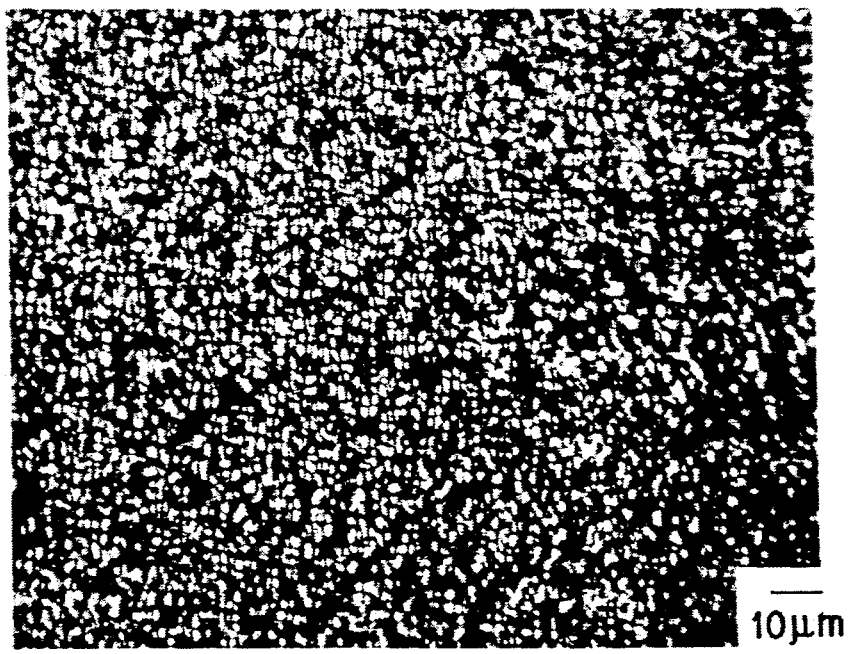

FIG. 5A is an optical photomicrograph of injection moldings made from nylon 6 treated in accordance with this invention and FIG. 5B is an optical photomicrograph of injection moldings formed from untreated nylon 6.

Figure 6:
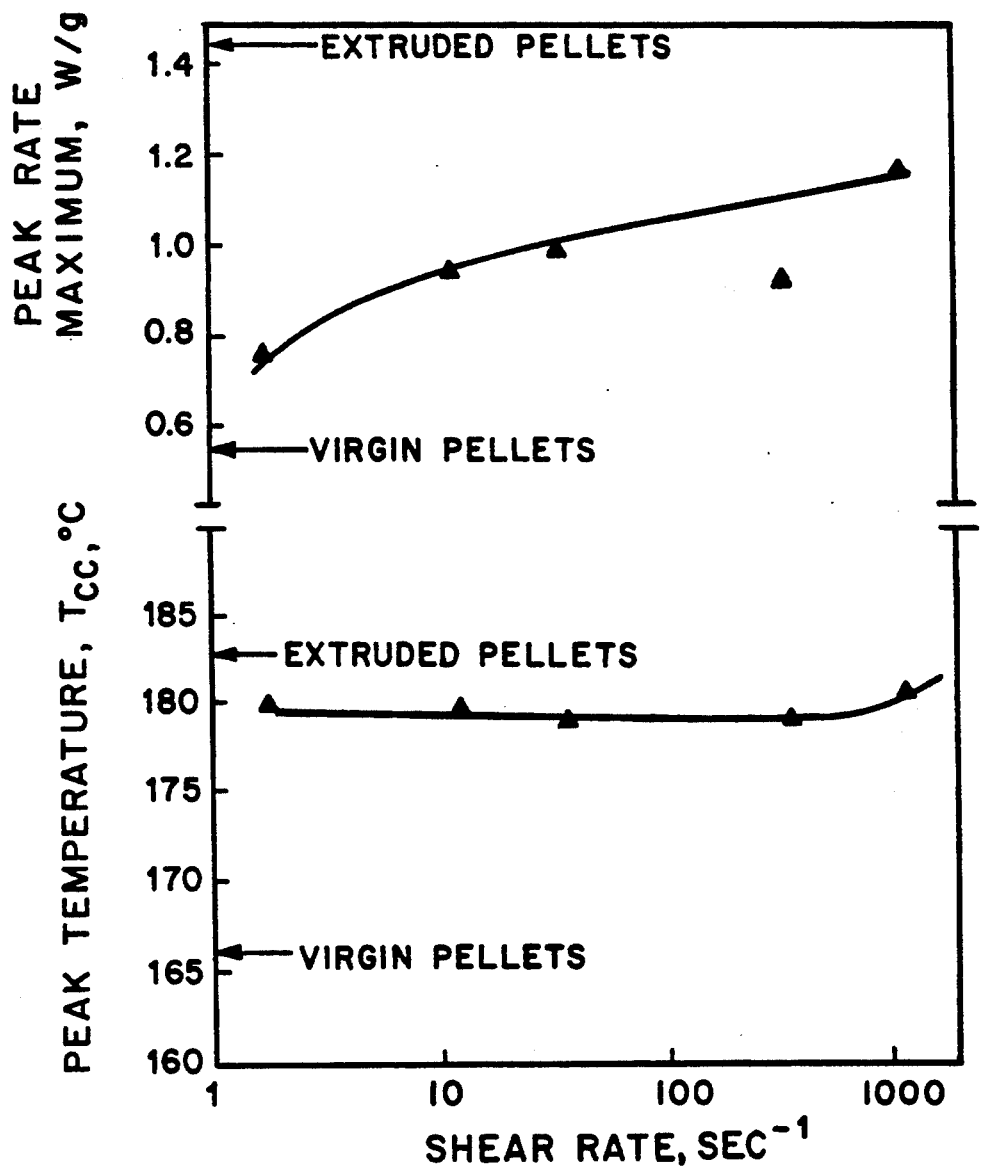

FIG. 6 is a graph showing the effect of shear rate at 260° C. on extrudates of virgin nylon 6 in terms of crystallization behavior.

Figure 7:
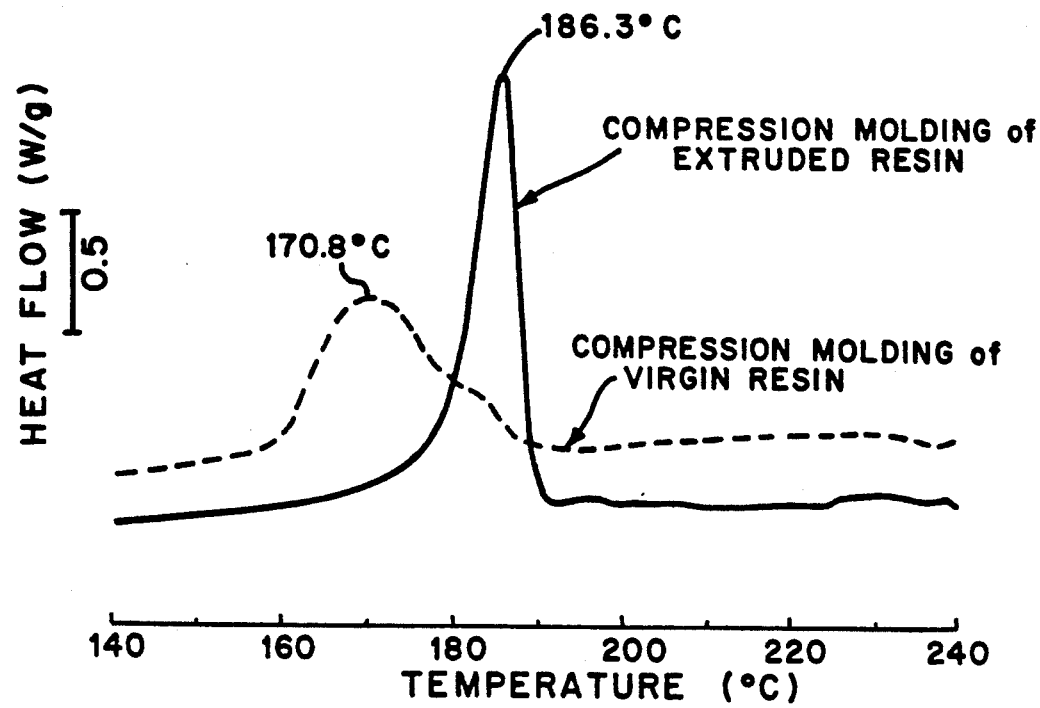

FIG. 7 are DSC thermograms showing the crystallization curves from the molten state for virgin nylon 6 and extruded nylon 6 compression moldings.

Figure 8:
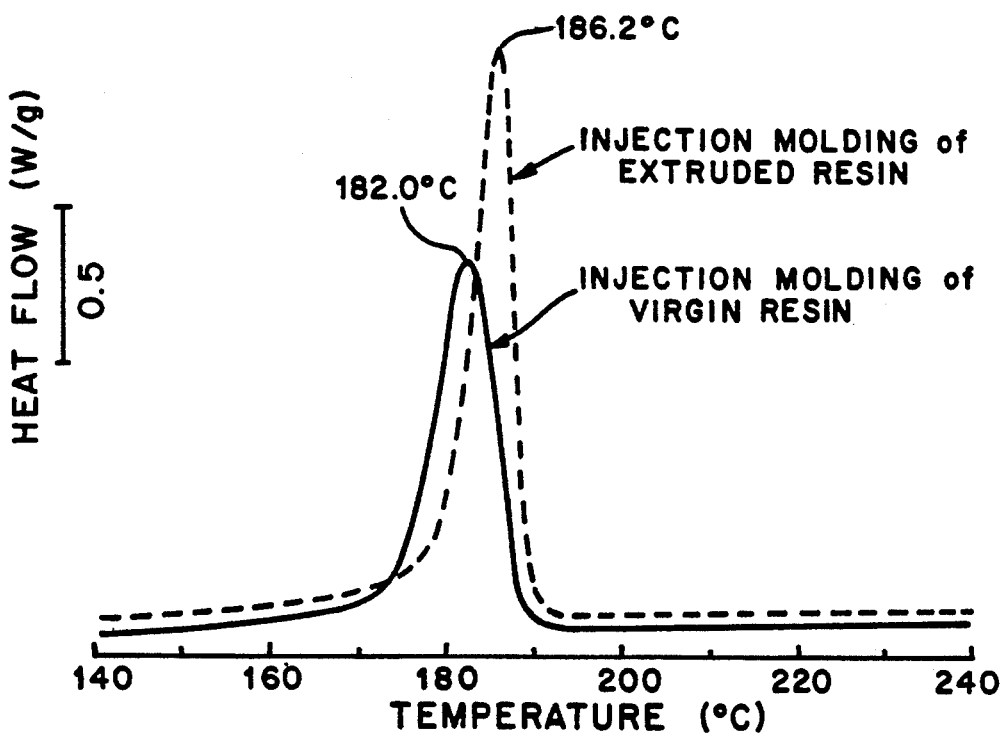

FIG. 8 are DSC thermograms showing the crystallization curves from the molten slate for virgin nylon 6 and extruded nylon 6 injection moldings.

DESCRIPTION OF THE PREFERRED EMBODIMENTS

In the first step of the process of this invention a polymer melt is formed. Methods of forming the melt may vary widely. Normally, the melt is formed by heating the polymer to a temperature which is equal to or greater than the melting point of the polymer. The manner in which the melt is formed is not critical and any conventional method can be employed. For example, a typical nylon 6 having a melting temperature at about 225° C. can be melted in an extruder at any temperature between about 225° C. and about 325° C. For nylon 6, a temperature of preferably about 250° C. to about 260° C. is normally employed. It is possible to use lower temperatures although a high melt viscosity would not be desirable for processing. Similarly, high temperatures can be used but a lower melt viscosity and the possibility of degradation are disadvantages. Thus, for every thermoplastic polymer there is an optimal temperature for melting prior to subjecting the polymer melt to shear.

The polymers useful in the practice of this invention are those which contain amino and/or carboxylic acid terminal groups. Illustrative of polymers which may be utilized in the process of this invention are synthetic linear polycarbonamides characterized by the presence of recurring carbonamide groups as in integral part of the polymer chain which are separated from one another by at least two carbon atoms. Polyamides of this type include polymers, generally known in the art as nylons, obtained from diamines and dibasic acids having the recurring unit represented by the general formula:

—NHCORCONHR$^1$— in which R is an alkylene group of at least two carbon atoms, preferably from about 2 to about 10; and R$^1$ is selected from R and phenyl groups. Also included are copolyamides and terpolyamides obtained by known methods, as for example, by condensation of hexamethylene diamine and a mixture of dibasic acids consisting of terephthalic acids and derivatives thereof, as for example, lactams.

Polyamides of the above description are well known in the art and include, for example, the copolyamide of 30% hexamethylene diammonium isophthalate and 70% hexamethylene diammonium adipate, the copolyamide of up to 30% bis-(p-amidocyclohexyl)methylene, and terephthalic acid and caprolactam, poly(hexamethyleneadipamide) (nylon 66), poly(4-aminobutyric acid) (nylon 4), poly(7-aminoheptanoic acid) (nylon 7), poly(8-aminooctanoic acid) (nylon 8), poly(6-aminohexanoic acid) (nylon 6), poly(hexamethylene sebacamide) (nylon 6,10), poly(heptamethylene pimelamide) (nylon 7,7), poly(octamethylene suberamide) (mylone 8,8), poly(hexamethylene sebacamide) (nylon 6,10), poly(nonamethylene azelamide) (nylon 9,9), poly(decamethylene azelamide) (nylon 10,9), poly(decamethylene sebacamide (nylon 10,10), poly[bis(4-aminocyclohexyl)methane-1,10-decanedicarboxamide] [(Quiana) (trans)], poly(m-xylylene adipamide), poly(p-xylylene sebacamide), poly(2,2,2-trimethylhexamethylene terephthalamide), poly(piperazine sebacamide), poly(mehtaphenylene isophthalamide) (Nomex), poly(p-phenylene terephthalamide) (Kevlar), poly(11-aminoundecanoic acid) (nylon 11), poly(12-aminododecanoic acid) (nylon 12), polyhexamethylene isophthalamide, polyhexamethylene terephthalamide, poly(9-aminononanoic acid) (nylon 9) polycaproamide, or combinations thereof. The polyamide for use in the most preferred embodiments of this invention is polycapriolactam which is commercially available from Allied-Signal Inc. under the tradename Capron TM Nylon.

Other polymers which may be employed in the process of this invention are linear polyesters. The type of polyester is not critical and the particular polyester chosen for use in any particular situation will depend essentially on the physical properties and features, i.e., tensile strength, modulus and the like, desired in the final fiber. Thus, a multiplicity of linear thermoplastic polyesters having wide variations in physical properties are suitable for use in the process of this invention.

The particular polyester chosen for use can be a homo-polyester or a co-polyester, or mixtures thereof as desired. Polyesters are normally prepared by the condensation of an organic dicarboxylic acid and an organice diol, and, therefore, illustrative examples of useful polyesters will be described hereinbelow in terms of these diol and dicarboxylic acid precursors.

Polyesters which are suitable for use in this invention are those which are derived from the condensation of aromatic, cycloaliphatic, and aliphatic diols with aliphatic, aromatic and cycloaliphatic dicarboxylic acids and may be cycloaliphatic, aliphatic or aromatic polyesters.

Exemplary of useful cycloaliphatic, aliphatic and aromatic polyesters which can be utilized in the practice of their invention are poly(ethylene terephthalate), poly(cyclohexylenedimethylene, terephthalate), poly(ethylene dodecate), poly(butylene terephthalate), poly[ethylene(2,7-naphthalate)], poly(methaphenylene isophthalate), poly(glycolic acid), poly(ethylene succinate), poly(ethylene adipate), poly(ethylene sebacate), poly(decamethylene azelate), poly(ethylene sebacate), poly(decamethylene adipate), poly(decamethylene sebacate), poly(dimethylpropiolactone), poly(parahydroxybenzoate) (Ekonol), poly(ethylene oxybenzoate) (Atell), poly(ethylene isophthalate), poly(tetramethylene terephthalate, poly(hexamethylene terephthalate), poly(decamethylene terephthalate), poly(1,4-cyclohexane dimethylene terephthalate) (trans), poly(ethylene 1,5-naphthalate), poly(ethylene 2,6-naphthalate), poly(1,4-cyclohexylidene dimethylene terephthalate) (Kodel) (cis), and poly(1,4cyclohexylidene dimethylene terephthalate (Kodel) (trans).

Polyester compounds prepared from the condensation of a diol and an aromatic dicarboxylic acid are preferred for use in this invention. Illustrative of such useful aromatic carboxylic acids are terephthalic acid, isophthalic acid and a o-phthalic acid, 1,3-napthalenedicarboxylic acid, 1,4-napthalenedicarboxylic acid, 2,6-napthalenedicarboxylic acid, 2,7-napthalenedicarboxylic acid, 4,4'-diphenyldicarboxylic acid, 4,4'-diphenysulphone-dicarboxylic acid, 1,1,3-trimethyl-5-carboxy-3-(p-carboxypheny)-idane, diphenyl ether 4,4'-dicarboxylic acid, bis-p(carboxyphenyl)methane and the like. Of the aforementioned aromatic dicarboxylic acids, those based on a benzene ring such as terephthalic acid, isophthalic acid, orthophthalic acid are preferred for use in the practice of this invention. Amongst these preferred acid precursors, terephthalic acid is particularly preferred acid precursor.

In the most preferred embodiments of this invention, poly(ethylene terephthalate), poly(butylene terephthalate), and poly(1,4-cyclohexane dimethylene terephthalate), are the polyesters of choice. Among these polyesters of choice, poly(ethylene terephthalate) is most preferred.

In the preferred embodiments of the invention, the polymers of choice are polyesters, polyamides, blends containing polyesters, and blends containing polyamides, and in the particularly preferred embodiments of the invention polyamides or polyamide blends are used. Amongst these particularly preferred embodiments most preferred are those embodiments in which the polyamide is nylon 6 or nylon 66.

Other optional ingredients may be added to the melt. For example, nucleating agents may be added to the melt. Useful nucleating agents may vary widely and can be any such material which is known for use in crystalline polymer as a nucleating agent. Illustrative of such materials are talc, mica, kaolin asbestos, alumina, silica, silver bromide, graphite, molybdenum disulfide, lithium fluoride, sodium phenylphosphinate, sodium isobutylphosphinate, magnesium oxide, mercuric bromide, mercuric chloride, cadmium acetate, lead acetate, silver chloride, kieselguhr and the like. Preferred for use in the praceict of this invention are talc, mica, kaolin, kieselguhr and asbestos.

In addition to the above-described essential components, the molding composition of this invention can include various optional components which are additives commonly employed with polyester and polyamide resins. Such optional components include fillers, plasticizers, impact modifiers, chain extenders, colorants, mold release agents, antioxidants, ultra violet light stabilizers, lubricants, antistatic agents, fire retardants, and the like. These optional components are well known to those of skill in the art, accordingly, only the preferred optional components will be described herein in detail.

The molding composition of this invention preferably includes a fibrous or particulate filler, which functions to increase the modulus and stiffness of the composition, and provides a more economical composition. Any conventional fibrous or particulate filler can be employed provided that it provides all or a portion of the above-identified functions, and does not otherwise have a deleterious effect on the composition. The fillers may optionally be treated with various coupling agents or adhesion promoters as is known to those skilled in the art. Useful fillers may be selected from a wide variety of minerals, metals, metal oxides, siliceous materials, metal salts, and materials thereof. Examples of such useful fillers include alumina, aluminum hydrates, feldspar, asbestos, talc, calcium carbonates, clay, carbon black, glass quartz, novaculite and other forms of silica, kaolinite, bentonite, garnet, mica, saponite, beidellite, calcium oxide, calcium hydroxide, and the like. Such fillers are well known materials and are readily available. The foregoing recited fillers are illustrative only and are not meant to limit the scope of the fillers that can be employed in this invention. In the preferred embodiments of this invention, fibrous materials such as fiber glass, carbon fibers, boron fibers and polymer fibers are the fillers of choice, and glass fibers is the filler of choice in the particularly preferred embodiments of this invention.

The quantity of filler employed is not critical and can be varied widely as desired. In the preferred embodiments of this invention, the quantity of filler is up to about 150 weight percent based on the total weight of the polymer component, and in the particularly preferred embodiment is in the range of about 30 to about 90 wt % on the same basis.

While not essential, it may be desirable to include an optional plasticizer in the composition of this invention. The plasticizer allows crystallization of the amorphous areas of the composition to continue at lower temperatures than if a plasticizer is not used. This is particularly important in low temperature molding. The plasticizers which can be used with the composition of the present invention are of the type known in the art as useful in linear polyamide molding compositions. Preferred plasticizers are those which are useful with polycaprolactam. Such useful plasticizer compositions are well known in the art and accordingly will not be described herein in detail.

The molding composition of this invention can be further modified by the addition of one or more pigments. Illustrative of useful pigments are iron oxide, cadmium red, rhodamine, chrome yellow, chrome green, and phthalocyanine blue.

The molding composition of this invention can be prepared by blending or mixing the essential ingredients, and other optional components, as uniformly as possible employing any conventional blending means. Appropriate blending means, such as melt extrusion, batch melting and the like, are well known in the art and will not be described herein in greater detail. In one useful procedure, the blending procedure can be carried out at elevated temperatures above the melting point of the polymer and the nucleating agent either preformed, or as individual components of the agent separately or as a combination of the components in a suitable form as for example, granules, pellets and preferably powders is added to the melt with vigorous stirring. Alternatively, all or a portion of the various components of the nucleating agent can be masterbatched or preblended with the polyamide in the melt and this premixed or masterbatch added to the polyamide in the melt in amounts sufficient to provide the desired amount of nucleating agent in the polyamide product. Stirring is continued until a homogeneous composition is formed. The nucleating agent can also be added to the melt coated on the surface of small particle inert powders which have a high surface volume ratios. The use of such inert powders, as for example, fused silica, fused alumina, carbon black and aerogels, and hydrogels of silica or alumina, helps to reduce the amount of nucleating agent required to provide optimum results. Accordingly, such powders will be employed in the conduct of the preferred embodiments of this invention. Blending temperatures and blending pressures, and the order of addition of the various components are not critical and may be varied as desired provided that a substantially homogeneous composition results. The blending procedure can be carried out at elevated temperatures, in which case the polymer component is melted and the solid nucleating agent and other optional ingredients are admixed therewith by vigorously stirring the melt. Similarly, the various solid components can be granulated, and the granulated components mixed dry in a suitable blender, or for example, a Banbury mixer, as uniformly as possible, then melted in an extruder and extruded with cooling.

In the second step of the process of this invention, the melt is subjected to a shear having an "effective shear rate". As used herein, an "effective shear rate" is a shear rate [as shear rate is defined in Ferdinand Rodriguez, "Principles of Polymer Systems", McGraw-Hill Book Company, New York (1982)] which is effective to provide an improvement in the optical, crystalline and/or mechanical properties of the polymer to any extent. In the preferred embodiments of the invention, the shear rate is greater than about 100 sec$^{-1}$. In these preferred embodiments of the invention, the upper limit for the shear rate is not critical provided that the shear rate is not so high as to physically degrade the polymer. In the particularly preferred embodiments of the invention, the shear rate is from greater than about 100 sec$^{-1}$ to about 20,000 sec$^{-1}$, and in the most preferred embodiments of the invention the shear rate is from about 1000 sec$^{-1}$ to about 10,000 sec$^{-1}$.

Any method which can be used to sheer a polymer melt or any liquid can be used. The method of choice is largely dictated by convenience. The shearing action can be provided by any appropriate method as for example by thermal shock, by pressure alteration, by ultrasonics or by mechanical means. Methods useful in shearing melts and liquids are known in the art, and will not be described in great detail. In one useful procedure, the polymer melt is sheared by thermal shock in which shearing is achieved by alternatively raising or lowering the temperature of the melt causing thermal expansions and resulting in internal stresses which cause the shear. In yet another useful procedure, the melt can be subjected to shear by electrical methods in which shear is achieved by high frequency electromagnetics waves impinging on the melt, and by electrical shock using waver amplitude and frequencies to cause shear. In still other procedures, shear is achieved by sudden pressure changes in pressure alterations methods; by ultrasonic techniques in which resonant vibrations which causes portions of the melt to vibrate or to be excited at different frequencies and thus shear; and mechanical methods in which portions of the melt are caused to flow past other portions of the melt by use of mechanical means such as stirrers and extruders. These methods of shearing polymer melts are merely representative of useful methods, and any method known in the art for shearing a polymer melt or any liquid can be used.

In the preferred embodiments of the invention, mechanical shearing methods are employed such as by extrusion or injection molding. In the particularly preferred embodiments of the invention, shearing is achieved by introducing the polymer melt at one end of the extruder (single or double screw) and receiving the sheared polymer at the other end of the extruder. The temperature of the polymer melt, the length of the extruder, residence time of the melt in the extruder and the design of the extruder (single screw, twin screw, number of flights per unit length, channel depth, flight clearance, mixing zone etc.) are several variable which control the amount of shear to be applied.

The molding compositions according to the invention can be partially crystalline to amorphous, depending on which individual constituents are employed. They are thermoplastic materials from which molded articles of manufacture having valuable properties can be produced by the conventional shaping processes, such as melt spinning, casting, injection molding and extruding. Examples of such moldings are components for technical equipment, apparatus castings, household equipment, sports equipment, components for the electrical and electronics industries and electrical insulations, car components, circuits, fibers, and semi-finished products which can be shaped by machining. The use of the materials for coating articles by means of immersion or powder coating processes is also possible, as is their use as hot-melt adhesives. The molding compositions according to the invention are outstandingly suitable for specific applications of all types since their spectrum of properties can be modified in the desired direction in manifold ways.

The molding compositions according to the invention are outstandingly suitable for the production of sheets and panels having valuable properties. The sheets and panels according to the inventions are suitable as coating materials for other materials comprising, for example, wood, glass, ceramic, metal or other plastics, and outstanding strengths can be achieved using conventional adhesion promoters, for example, based on vinyl resins. The sheets and panels can also be laminated with other plastic films and this is preferably effected by joint extrusion, the sheets being bonded in the molten state. The surfaces of the sheets and panels, including those in the embossed form, can be improved or finished by conventional methods, for example by lacquering or by the application of protective films. The compositions of this invention are especially useful for fabrication of extruded films, as for example, films for use in food packaging. Such films can be fabricated using conventional film extrusion techniques.

EXAMPLE I

In this example, commercial poly(caprolactam) (nylon 6) trade description Capron ® grade 8207F obtained from Allied-Signal Inc. having a $M_w$ of 35,000–40,000 was used. In this experiment, the nylon 6 was melted and subjected to shear by feeding the nylon into the throat of a twin screw extruder (marketed by Leistritz Corp.) or a single screw extruder marketed by Egan). For the twin screw extruder (lab size 30 mm diameters), the temperature profiles are as follows: Throat cold, −250° C., −260° C., −260° C., −260° C., −200° C., −250° C., −260° C., −Die. The extruder was operated at 40 revolutions per minute and at a rate of 17 lbs. per hour.

COMPARATIVE EXAMPLE I

A series of experiments were carried out to show the superior crystallization characteristics of the Nylon 6 compositions of Example I treated in accordance with the process of this invention and unprocessed Nylon 6 used in Example I as determined by differential scanning calorimetry (DSC) experiments.

The DSC experiments were carried out using a DuPont 9900 automated system, in an argon atmosphere. A sample of 10.0±0.2 mg was crimpled in an aluminum cup, heated to 280° C. at a program rate of 10 C./min. held at 280° C. for 5 minutes and then cooled at 10 C./min. rate to obtain the $T_{cc}$ (the crystallization temperature upon cooling). For isothermal crystallization, the sample after 280° C./5 min. treatment was cooled to 200° C. and crystallized isothermally. The peak width at halfheight ($t_{0.5}$ min) was evaluated for the isothermal DSC peak; its reciprocal e.g. $1,000/t_{0.5}$ is indicative of the overall crystallization rate. The results of these experiments are set forth in the following Table I.

Young's Modulus, Tensile Strength, Breaking Strength, Yield Strength, Yield Stain and Total Elongation of each plaque was evaluated twelve times using the procedure of ASTM D638.

The results of these evaluations are set forth in the following Table II. In Table II, the abbreviations have the following meanings:
(a) "YM" is Young's Modulus.
(b) "TS" is Tensile Strength.
(c) "BS" is Breaking Strength.
(d) "YS" is Yield Stress.
(e) "EB" is Elongation to Break.

TABLE II

| Ex. No. | Composition | % Crystallinity by X-ray | Mechanical Properties | | | | |
|---|---|---|---|---|---|---|---|
| | | | EB(%) | YM(GPa) | TS(MPa) | BS(MPa) | YS(MPa) |
| (1) | EXAMPLE I | 51 | 18 ± 6 | 3.1 ± 0.1 | 83.0 ± 1.1 | 75 ± 3.7 | 83.4 ± 1.1 |
| (2) | Non-Processed | 50 | 120 ± 102 | 2.8 ± 0.1 | 78.3 ± 0.8 | 64.3 ± 8.4 | 78.2 ± 0.8 |

The mechanical properties of the molded pieces are superior if nylon 6 pellets processed in accordance with this invention are used for compression molding as

TABLE I

| Ex. No. | Composition | Molecular Weight (MW) | Programed Crystallization Temperature, $T_{cc}$ °C. | Isothermal Crystallization Rate @ 200° C. (1000/(0.5 min$^{-1}$) |
|---|---|---|---|---|
| (1) | EXAMPLE I (pellets) | 37,000 | 184 184 | 267 |
| (2) | unprocessed (pellets) of EXAMPLE I | 38,000 | 169 168 | to slow to be measured |

As shown in Table I and FIG. I, nylon 6 treated in accordance with the process of this invention has a higher crystallization rate as indicated by the isothermal crystallization values.

COMPARATIVE EXAMPLE II

Nylon 6 pellets used in Example I and processed in accordance with this invention and unprocessed pellets used in Example I were compression molded into about 5 mil (0.125 mm) films and also into 50 mil (1.25 mm) thick plaques using the following procedure: The pellets were first dried under vacuum at 110° C. overnight. A sample of nylon 6 pellets was charged into the appropriate window-frame (5 or 50 mil thick) which was encapsulated between Teflon coated aluminum sheets. This assembly was placed between steel discs and molded under pressure at about 245° C. The whole assembly was then cooled in air, and the molded pieces taken out at room temperature and their crystallization characteristics were evaluated by DSC. The results are shown in FIG. II. The data in FIG. II demonstrates that the films made from the processed pellets crystallized much faster than films made from unprocessed nylon 6 reveal that the film of processed pellets has a smaller spherulite size which is consistent with its higher crystallization rate. This is also shown by the corresponding optical photomicrographs of FIG. III. The results of COMPARATIVE EXAMPLE II shows that compression molded articles from nylon 6 treated in accordance with this invention have superior optical and/or crystalline characteristics as compared to untreated nylon 6 pellets.

COMPARATIVE EXAMPLE III

The plaques of COMPARATIVE EXAMPLE II were dried over $P_2O_5$ for about one week and the compared to unprocessed pellets.

Differential scanning calorimetry (DSC) crystallization curves (FIG. IV) show that the injection molded articles of nylon 6 processed in accordance with this invention crystallizes faster than those formed from unprocessed nylon 6. Optical photomicrographs (FIG. V) also demonstrate that nylon 6 processed in accordance with this invention forms injection molded articles of small spherulitix size with the pseudo-appearance of a nucleating nylon 6.

COMPARATIVE EXAMPLE III

Nylon 6 pellets used in Example I processed in accordance with this invention and unprocessed pellets used in Example I were injection molded using the following procedure:

Nylon 6 pellets used in Example I and processed in accordance with the process of this invention and unprocessed nylon 6 pellets were fed into an Arburg injection molding machine. The barrel melt profile is set at 240° C. The polymer melt is injected into a mold maintained at a temperature of 120° C. The mold is then cooled in air, all the molded pieces taken out at room temperature.

COMPARATIVE EXAMPLE IV

A series of experiments were carried out to show the effect of shear rate on the crystalline properties of nylon 6. In these experiments, an Instron Capillary Rheometer was used to measure the steady shear viscosity over the shear rate range of 1.6 sec$^{-1}$–1200 sec$^{-1}$. After charging the rheometer, the barrel was evacuated to 1 mm–5 mm Hg for 30 seconds to remove the trapped air prior to melting and thus yield bubble free extrudates. A single capillary with diameter 0.030" and length 2" (L/D 66) was used at all times. The extrudates obtained at different shear rates were collected for further analysis for its crystallization behavior, in accordance with the DSC procedures of COMPARATIVE EXAMPLE I. The results are set forth in FIG. 6.

COMPARATIVE EXAMPLE V

An additional series of experiments were conducted to show the effect of shear rate on the crystalline properties of nylon 6. In these experiments, compression molded plaques of virgin and extruded nylon 6 resins, and injection molded virgin and extruded nylon 6 resins were analyzed for their crystallization behavior in accordance with the DSC procedure of COMPARATIVE EXAMPLE I. The compression molded nylon 6 was subjected to a shear rate of from about 1 sec$^{-1}$ to 10 sec$^{-1}$ and the injection molded nylon 6 was subjected to a shear rate of about 1000 sec$^{-1}$ to about 10,000 sec$^{-1}$. (See Ferdinand Rodriguez, *Principles of Polymer Systems*, McGraw-Hill Book Company New York, (1982) pp. 156-157).

The results of the experiments are set forth in FIGS. 7 and 8.

What is claimed is:

1. A process for improving the thermal, optical and/or mechanical properties of a polymer in the absence of a nucleating agent which comprises the steps of:
   a) forming a melt of a polymer; and
   b) subjecting said melt, prior to molding to an effective shear rate of greater than about 100 sec$^{-1}$ for time sufficient to improve the thermal, optical and/or mechanical properties of said polymer; wherein said polymer is selected from one or more of the following groups of polymers;

—NHCORCONHR'—  (i)

in which R is an alkylene group of at least two carbon atoms, and R' is selected from R and phenyl groups;
   (ii) the copolyamide of 30% hexamethylene diammonium isophthalate and 70% hexamethylene diammonium adipate, the copolyamide of up to 30% bis-(p-amidocyclohexyl)methylene, and terephthalic acid and caproactam, poly (hexamethylene adipamide), poly(4aminobutyric acid), poly(7-amino-heptanoic acid), poly(8 aminooctanoic acid), poly(6-aminohexanoic acid), poly((bis(4-aminocyclohexy)methane-1.10-decanedicarboxamide)), poly(peperazine sebacamide), poly(11-amino undecanoic acid), poly(12-aminododecanoic acid), polyhexamethylene isophthalamide, poly(9-aminononanoic acid), polycaproamide, or combinations thereof; and
   (iii) poly(ethylene terephthalate), poly(cyclohexylenedimethylene, terephthalate), poly(ethylene dodecate, poly(butylene terephthalate), poly(ethylene(2,7-naphthalate), poly(glycolic acid), poly(ethylene succinate), poly(ethylene adipate), poly(ethylene sebacate), poly(decamethylene azelate), poly(decamethylene adipate), poly(decamethylene sebacate), poly(dimethylpropiolactone), poly(ethylene oxybenzoate), poly(ethylene isophthalate), poly(tetramethylene terephthalate, poly(hexamethylene terephthalate), poly(decamethylene terephthalate), poly(1,4-cyclohexylidene dimethyleneterephthalate), and poly(1,4-cyclohexylidene dimethylene terephthalate.

2. A process according to claim 1 wherein said polymer is a polyester.

3. A process according to claim 3 wherein said polyester is polyethylene terephthalate.

4. A process according to claim 1 wherein said polyamide is poly(6-aminohexanoic acid) or poly(hexamethylene adipamide).

5. A process according to claim 1 wherein said polyamide is poly(6-aminohexanoic acid).

6. A process according to claim 1 wherein said polymer melt is subjected to a shear by mechanical means.

7. A process according to claim 6 wherein said polymer melt is subjected to a shear by extruding said melt through an extruder at a temperature equal to or greater than the melting point of said polymer.

8. A process according to claim 1 wherein said shear rate is from greater than about 100 sec$^{-1}$ to about 20,000 sec$^{-1}$.

9. A process according to claim 8 wherein said shear rate is from greater than about 100 sec$^{-1}$ to about 10,000 sec$^{-1}$.

10. A process according to claim 9 wherein said shear rate is from about 1000 sec$^{-1}$ to about 10,000 sec$^{-1}$.

11. A process according to claim 1 wherein said polymer melt is subject to a shear at least twice, at least one of which is at an effective shear rate.

12. A polymer processed according to the process of claim 1.

13. A process for forming a molded article having improved optical, mechanical and/or thermal properties, said process comprising molding the polymer of claim 12 to form said molded article.

14. A molded article formed in accordance with the process of claim 13.

15. The process according to claim 1 wherein the polymer is selected from the group consisting of poly(ethylene terephthalate), poly(butene terephthalate) and poly(1,4-cyclohexane dimethylene terephthalate).

16. The process according to claim 1 wherein R' and R are the same.

17. The process according to claim 1 wherein R' and R are different.

18. A process according to claim 1 wherein in the formula

—NHCORCONHR'—  (I)

R is an alkylene group of having from 2 to about 10 carbon atoms; and R' is selected from R and phenyl groups.

19. A process according to claim 11 wherein said first shear is an effective shear rate of greater than about 100 sec$^{-1}$.

20. The process of claim 19 wherein the second shear is effected by molding.

21. The process of claim 20 wherein said molding is injection molding.

22. The process of claim 20 wherein said molding is injection, compression on extrusion molding.

* * * * *